Nov. 24, 1925.
S. HANSSON
1,562,503
TRUCK BEARING
Filed Oct. 25, 1924    3 Sheets-Sheet 1
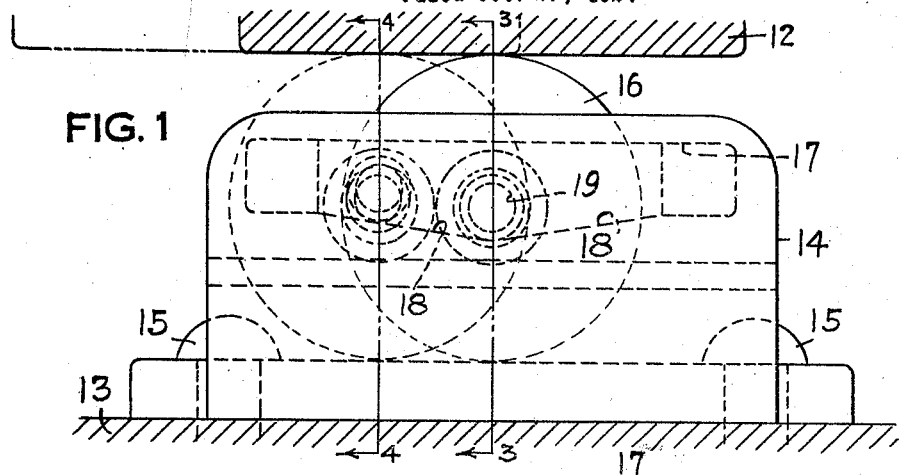
FIG. 1
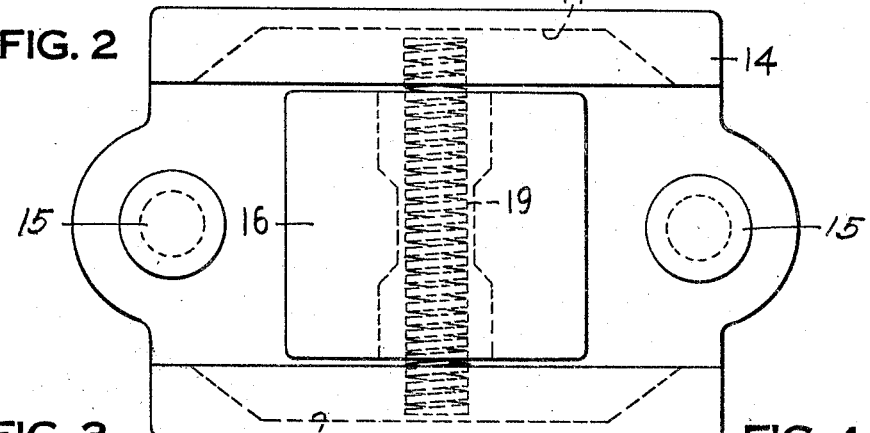
FIG. 2
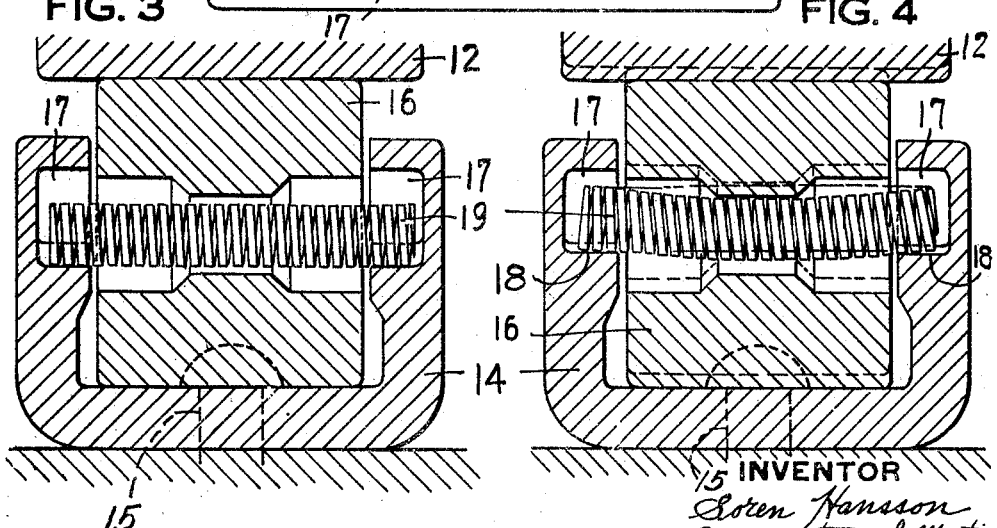
FIG. 3
FIG. 4
INVENTOR
Loren Hansson
By Kay, Totten & Martin
Attorneys Nov. 24, 1925.  S. HANSSON  1,562,503
TRUCK BEARING
Filed Oct. 25, 1924    3 Sheets-Sheet 2

INVENTOR
Soren Hansson
By Kay, Totten & Martin,
Attorneys.

Nov. 24, 1925.

S. HANSSON 1,562,503

TRUCK BEARING

Filed Oct. 25, 1924  3 Sheets-Sheet 3

INVENTOR
Loren Hansson
By Kay, Totten & Martin,
Attorneys

Patented Nov. 24, 1925.

1,562,503

UNITED STATES PATENT OFFICE.

SOREN HANSSON, OF BUTLER, PENNSYLVANIA.

TRUCK BEARING.

Application filed October 25, 1924. Serial No. 745,931.

*To all whom it may concern:*

Be it known that I, SOREN HANSSON, a subject of the King of Norway, and a resident of Butler, in the county of Butler and State of Pennsylvania, have invented a new and useful Improvement in Truck Bearings; and I do hereby declare the following to be a full, clear, and exact description thereof.

My invention relates to truck bearings, and particularly to an improved form of anti-friction bearings, especially suitable for employment between the body and truck bolsters of railway cars.

One object of my invention is to provide an anti-friction bearing which may normally occupy an intermediate position upon the bearing surface of a truck bolster but which is provided with means for returning it to normal position when it has been caused to move along the bearing surface, through relative movement of the body and truck bolsters in a horizontal plane.

Another object of my invention is to provide an improved form of bearing which will not bind in operation and which may be conveniently assembled and disassembled.

Still another object of my invention is to simplify and improve generally the structure of devices of the character referred to.

Figure 5:
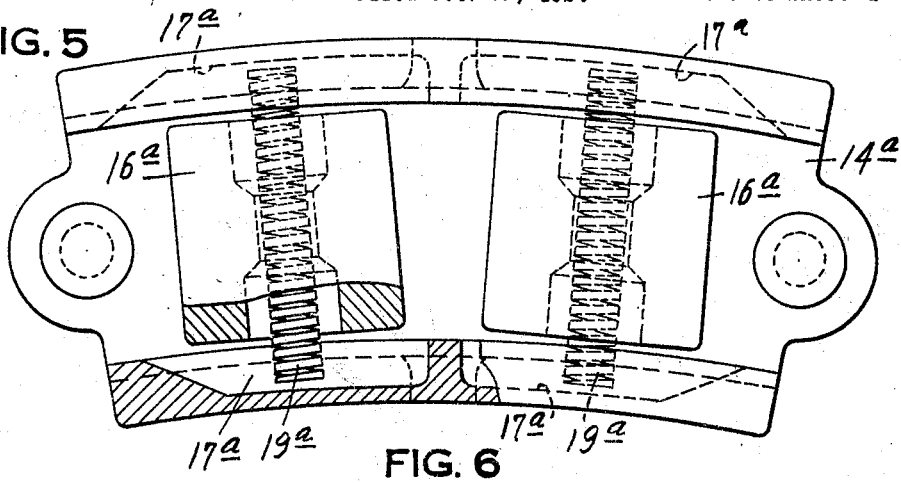
Figure 6:
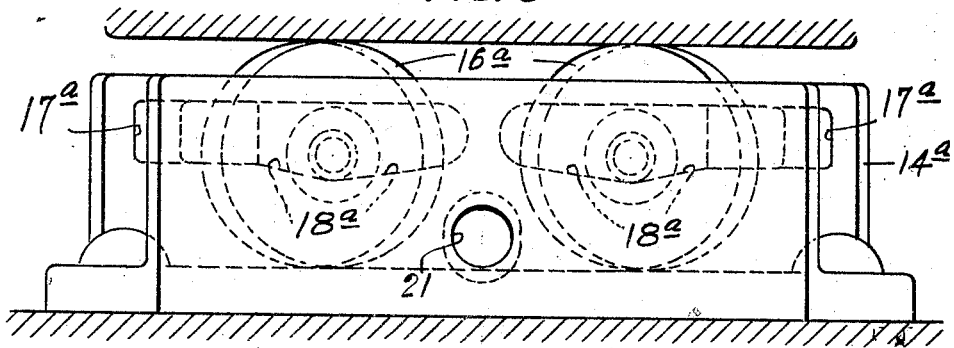
Figure 7:
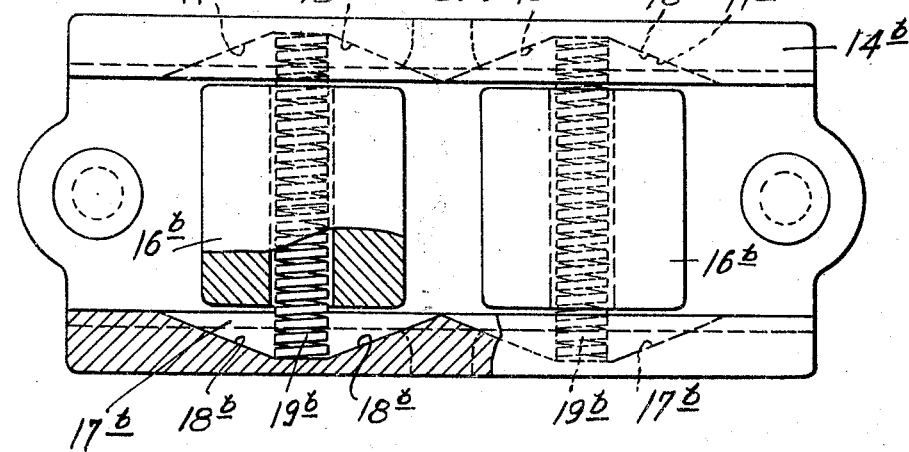
Figure 8:
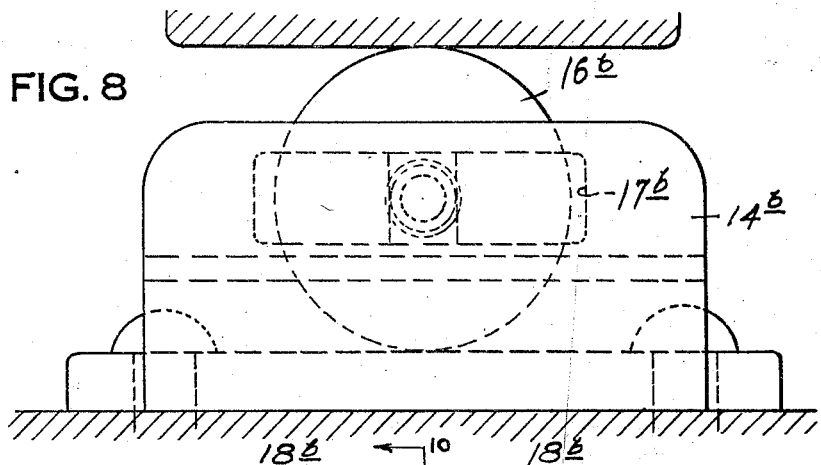
Figure 9:
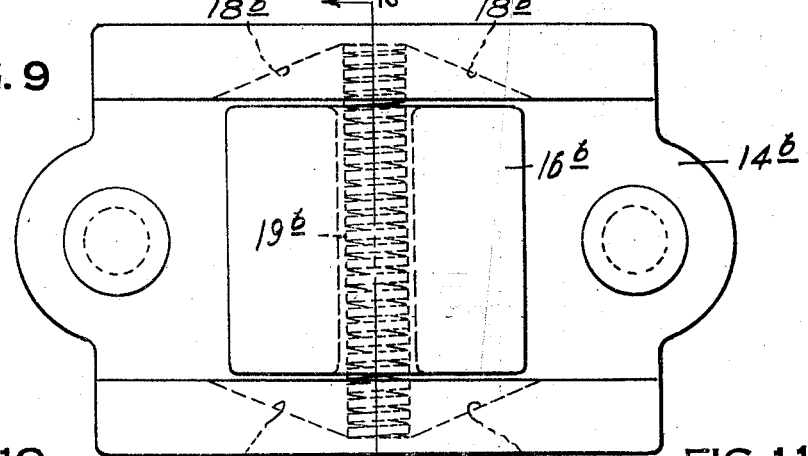
Figure 10:
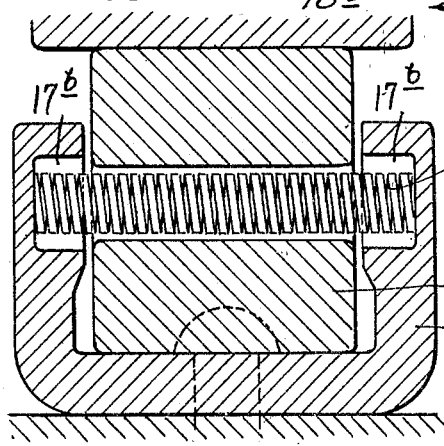
Figure 11:
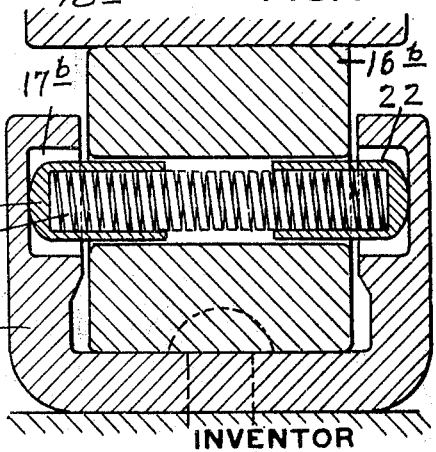

Some of the forms which my invention may take are shown in the accompanying drawing wherein Fig. 1 is a view looking endwise of the bolster and showing the bearing structure in side elevation; Fig. 2 is a sectional plan view of the device of Fig. 1; Fig. 3 is a view taken on the line 3—3 of Fig. 1; Fig. 4 is a view taken on the line 4—4 of Fig. 1; Fig. 5 is a view of modified form of the structure shown in Figs. 1 to 4 but showing the manner in which a plurality of anti-friction members may be mounted upon a single bolster; Fig. 6 is a side elevational view of the device of Fig. 5; Fig. 7 is a view, partially in plan and partially in section, of a modification of the apparatus shown in Fig. 5; Fig. 8 is a view similar to that of Fig. 1, but showing a modified form of bearing mounting; Fig. 9 is a view, partially in plan and partially in section of the device of Fig. 8; Fig. 10 is a view taken on the line 10—10 of Fig. 9, and Fig. 11 is a view, partially in section and partially in end elevation, of a device similar to that of Fig. 10 but showing bearing caps for the ends of the spring.

Referring to Figs. 1 to 4, 12 indicates in cross section a bearing plate for the body bolster, upon which the car body (not shown) is adapted to be supported in the usual manner, and 13 represents the truck bolster that is supported upon a car truck (not shown). It will be understood that the bearings herein described are interposed between the opposing surfaces of the body and truck bolsters, adjacent to the ends of such bolsters.

The bearing structure proper consists of a drop-forging 14 of general channel form that may be bolted or riveted to the bolster 13 as indicated at 15. The bottom of the channel serves as bearing surface for a roller 16, the upper side of which roller is engaged by the bearing plate 12, when the car body has certain movements with relation to the truck, as well understood in the art.

The flanges or side portions of the member 14 are provided with recesses or slots 17 whose lower walls are inclined from their ends towards the mid-portion thereof, as indicated at 18 in Fig. 1. A helical spring 19 extends through the roller 16 and its ends are supported upon the inclined ways 18 when the roller assumes the position indicated in dotted lines in Fig. 1, for instance. It will be noted that the roller 16 is cut away at its central portion to provide ample clearance as between it and the spring 19 which, under certain conditions, serves as an axle for the roller.

When, through swaying of the car body or relative vertical movement as between the car body and the truck, the upper bearing plate 12 is brought into engagement with the roller 16 and movement of the truck on the center pin occurs while such engagement is had, the roller will be moved longitudinally of the bearing block or housing 14 and the spring 19 be carried therewith. If this movement is of sufficient degree, the spring will move up one pair of inclines 18 until it is caused to assume the position shown in Fig. 4. Upon removal of the weight from the top of the roller 16 by upward movement of the plate 12, the spring will tend to elevate the roll and straighten itself, whereupon it will roll down the inclines to the position shown in full lines in Fig. 1. The dotted lines in Fig. 1 may be taken to illustrate the position of the roller and spring before its return movement occurs.

The spring and the roll may be placed in a housing 14, by compressing the spring within the roller and slipping them into place through the opening in the upper side of the housing block 14.

In Fig. 5 I have shown an arrangement particularly suitable for heavy service, in that a pair of rollers 16ª are provided instead of a single roller. These rollers may be mounted in a single housing or casing 14ª which is mounted upon the truck plates in the same manner as is the housing 14. These rollers are provided with springs 19ª that are supported within guide-ways 17ª corresponding to the guide-ways 17 of Figs. 1 to 4. The bottoms of these guide-ways are inclined from their ends toward their mid-portions as indicated at 18ª. It will be obvious that the rollers 16ª will function in the same manner as do rollers 16. An opening 21 may be provided in the side of the casing 14ª to prevent accumulation of dirt or moisture within the casing. The cage 14ª may be curved slightly as shown in Fig. 5, concentrically to the center pin, to reduce the tendency of the ends of the rollers to bind against the side walls of the housing when the truck has swivelling movement during imposition of weight thereon.

Referring now to Fig. 7, I show a modified form of cage or housing 14ᵇ which has recesses 17ᵇ whose bottom walls may be parallel to the longitudinal axis of the housing 14ᵇ, but whose side walls 18ᵇ are angularly disposed. Springs 19ᵇ corresponding to the springs 19 extend through the rollers 16ᵇ but instead of being bent as shown in Fig. 4 when the rollers are actuated, are compressed between the oppositely disposed angular surfaces 18ᵇ as will be apparent upon inspection of Figs. 7 to 10.

The structure of Fig. 7 differs from the structures of Figs. 8 to 10 in substantially the same respects as do Figs. 5 and 6 from Figs. 1 to 4, in that Fig. 7 shows a plurality of anti-friction rollers and Figs. 8 to 10 show single-roller structures.

Fig. 11 differs from Fig. 10 in that caps or housings 22 are provided for the spring, to reduce the friction between the spring and the side walls of the housing.

It will be apparent that the cage or housing containing the rollers may be applied to the body bolster instead of the truck bolster and that some other element may be substituted for the helical spring.

Various other changes in detail and general arrangements may be made without departing from the spirit and scope of the invention as defined in the accompanying claims.

I claim as my invention:

1. A truck bearing comprising a casing, an anti-friction roller within said casing normally adapted to seat upon the bottom thereof, inclined guide-ways extending from the mid-portion toward each end of the casing, a yieldable member disposed transversely of the casing and extending through said roller and having its ends disposed within said guide-ways, the parts being so proportioned that when the roller is deflected from normal position, the guide ways will cause distortion of said flexible member to effect return of the roller.

2. Bearing structure comprising a casing, an anti-friction roller disposed within said casing in position to seat upon the bottom thereof, upwardly inclined guide-ways disposed above the bottom of said casing, a yieldable member extending through said roller and having its ends positioned to roll upon said guide-ways when the roller is moved to abnormal position, whereby the roller may be returned to normal position by the action of gravity, upon release of the moving force.

3. Bearing structure comprising a casing adapted to be mounted upon a truck bolster and having an opening in its upper side, inclined guideways in said casing, a roller in said casing, a yieldable member extending through said roller and having its ends disposed above said guide ways, and a bearing plate adapted to be secured to a body bolster, the said guideways being so positioned as to cause said member to yieldably move the roller toward said plate when in abnormal position and to cause return of the roller to normal position upon disengagement thereof from the bearing plate.

In testimony whereof I the said SOREN HANSSON have hereunto set my hand.

SOREN HANSSON.